(12) United States Patent
Zhu et al.

(10) Patent No.: US 11,515,773 B2
(45) Date of Patent: Nov. 29, 2022

(54) LINEAR VIBRATION MOTOR AND ELECTRONIC DEVICE

(71) Applicant: Goertek, Inc., Weifang (CN)

(72) Inventors: Yueguang Zhu, Weifang (CN); Chao Wang, Weifang (CN); Chunfa Liu, Weifang (CN)

(73) Assignee: Goertek, Inc., Weifang (CN)

( * ) Notice: Subject to any disclaimer, the term of this patent is extended or adjusted under 35 U.S.C. 154(b) by 530 days.

(21) Appl. No.: 16/489,161

(22) PCT Filed: Jun. 21, 2017

(86) PCT No.: PCT/CN2017/089388
§ 371 (c)(1),
(2) Date: Aug. 27, 2019

(87) PCT Pub. No.: WO2018/157509
PCT Pub. Date: Sep. 7, 2018

(65) Prior Publication Data
US 2019/0379263 A1    Dec. 12, 2019

(30) Foreign Application Priority Data

Mar. 3, 2017  (CN) .......................... 201720206255.2

(51) Int. Cl.
  *H02K 33/16*   (2006.01)
  *H02K 33/06*   (2006.01)
  *B06B 1/04*    (2006.01)

(52) U.S. Cl.
  CPC ............. *H02K 33/06* (2013.01); *H02K 33/16* (2013.01); *B06B 1/045* (2013.01)

(58) Field of Classification Search
  CPC ........ H02K 33/00–33/06; H02K 33/10; H02K 33/16; B06B 1/045
  See application file for complete search history.

(56) References Cited

U.S. PATENT DOCUMENTS

2007/0216235 A1* 9/2007 Lee .................. H02K 33/16
                                                         310/36

FOREIGN PATENT DOCUMENTS

JP            1997285096 A       10/1997

\* cited by examiner

*Primary Examiner* — Ramon M Barrera
(74) *Attorney, Agent, or Firm* — Baker Botts LLP

(57) ABSTRACT

A linear vibration motor is provided, comprising a housing, a spring part, a vibrator and a stator, the housing having a chamber, the stator, the vibrator and the spring part being provided in the chamber, the vibrator comprising a counterweight part and a magnet connected together, the stator comprising a pole core and a coil, the pole core being connected to the housing, the coil being wound around the pole core, the housing being configured to be magnetically conductive, the vibrator being suspended relative to the stator by the spring part, the housing comprising a top part and an opposed bottom part, and the vibrator being configured to vibrate along a connecting line between the top part and the bottom part.

8 Claims, 8 Drawing Sheets

LINEAR VIBRATION MOTOR AND ELECTRONIC DEVICE

CROSS-REFERENCE TO RELATED APPLICATIONS

This application is a National Stage of International Application No. PCT/CN2017/089388, filed on Jun. 21, 2017, which claims priority to Chinese Patent Application No. 201720206255.2, filed on Mar. 3, 2017, both of which are hereby incorporated by reference in their entireties.

TECHNICAL FIELD

The present disclosure relates to the technical field of vibration device, and in particular, to a linear vibration motor and an electronic device.

BACKGROUND

At present, linear vibration motors each use a single driving system, for example, a driving motor formed by a magnet and a coil using Lorentz force, and for example, a magnetic-type driving motor comprised of a magnet and an electromagnet. The single driving system leads to an increase of response time of the linear vibration motor.

The response time refers to a time spent by the linear vibration motor from starting to vibrate to reach a predetermined vibration state.

For a single driving system, if the response time of the linear vibration motor is to be shortened, the volume of a magnetic circuit has to be enlarged. As a result, however, without changing the outer dimensions of a product, the resonant frequency is increased and the vibration sense is reduced, thereby resulting in a poor user experience.

SUMMARY

One object of the present disclosure is to provide a new technical solution of a linear vibration motor.

According to one aspect of the disclosure, there is provided a linear vibration motor, comprising a housing, an spring part, a vibrator and a stator, the housing having a chamber, the stator, the vibrator and the spring part being provided in the chamber, the vibrator comprising a counterweight part and a magnet connected together, the stator comprising a pole core and a coil, the pole core being connected to the housing, the coil being wound around the pole core, the housing being configured to be magnetically conductive, the vibrator being suspended relative to the stator by means of the spring part, the housing comprising a top part and an opposed bottom part, and the vibrator being configured to be able to vibrate along a connecting line between the top part and the bottom part.

Optionally, the housing is a cuboid.

Optionally, the stator is arranged on a side wall of the housing, the coil being in parallel with the side wall.

Optionally, an extending direction of the coil is in parallel with that of the vibrator.

Optionally, the stator comprises two stators respectively arranged on a side wall of the housing, the two stators being arranged to be opposed to the vibrator.

Optionally, the magnet comprises two magnets arranged in an opposite manner on both sides of the counterweight part, the two magnets corresponding to two coils respectively.

Optionally, the side wall is concaved inwards to form the pole core.

Optionally, the linear vibration motor further comprises a frame inside the chamber, the frame being configured to be magnetically conductive, with one end of the frame being connected to the top part and the other end of the frame being connected to the bottom part, the pole core comprising two pole cores arranged in an opposite manner at a middle part of the frame, the coil comprising two coils wound around the two pole cores respectively, and the magnet comprising two magnets corresponding to the two coils respectively.

Optionally, the pole core is formed in one piece with the frame.

Optionally, the counterweight part has a middle hollow area, the two magnets being arranged at both sides of the middle hollow area, and the vibrator being sleeved outside the stator.

According to a further aspect of the disclosure, there is provided an electronic device. Said device comprises the linear vibration motor as disclosed by the present disclosure.

One technical effect of the present disclosure lies in that the linear vibration motor according to the embodiments of the disclosure has its pole core directly or indirectly connected to the housing. Since the housing is magnetically conductive, an electromagnetic field generated by the coil can be transmitted to the housing via the pole core, such that the polarity of the top part and the bottom part is the same as the polarity of one end of the pole core that is connected to the housing. The top part and the bottom part with polarity interact with the magnet, in order to provide an extra driving force for the vibration of the vibrator. In such a way, the driving force for the vibration of the vibrator is increased, which leads to a remarkable promotion of the response speed of the linear vibration motor, thereby the response time is effectively shortened and the vibration effect is improved.

Further features of the present disclosure and advantages thereof will become apparent from the following detailed description of exemplary embodiments according to the present disclosure with reference to the following drawings.

BRIEF DESCRIPTION OF THE DRAWINGS

The accompanying drawings, which constitute a part of the specification, illustrate embodiments of the disclosure and, together with the description thereof, serve to explain the principles of the disclosure.

DESCRIPTION OF REFERENCE SIGNS

Figure 1:
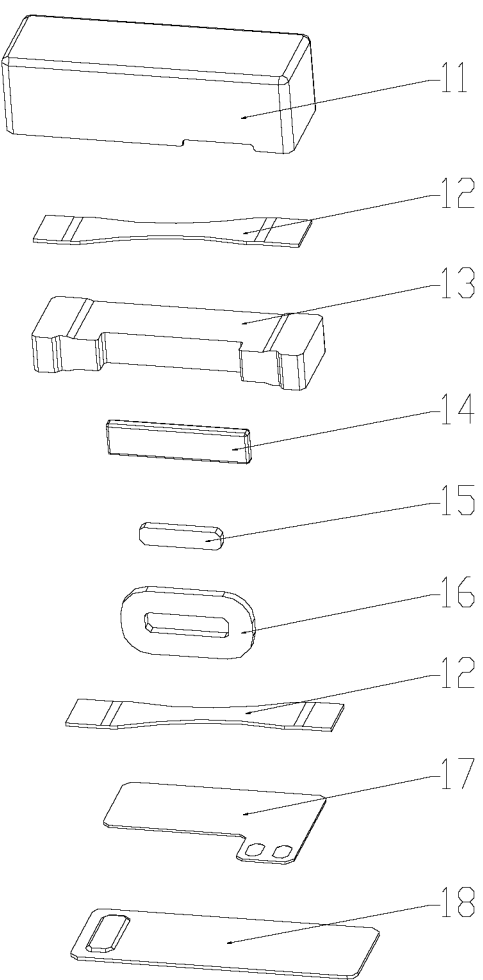
FIG. 1 is an exploded view of a linear vibration motor according to one embodiment of the present disclosure.

11: upper housing; 12: spring strip; 13: mass block; 14: magnet; 15: pole core; 16: coil; 17: FPCB; 18: lower housing; 19: top part; 20; bottom part; 21: protrusion; 22: bulge; 23: frame; 24: middle hollow area; 25: side wall.

DETAILED DESCRIPTION

Various exemplary embodiments of the disclosure now will be described in detail by reference to the drawings. It should be noted that the relative arrangements of components and steps, the numerical expressions and the numerical values set forth in the embodiments do not limit the scope of the disclosure unless it is otherwise stated.

The following description of at least one exemplary embodiment is merely illustrative in nature and is in no way intended to limit the disclosure, its application, or uses.

Techniques and apparatus as known by one of ordinary skilled persons in the relevant art may not be discussed in detail but are intended to be part of the specification where appropriate.

In all of the examples shown and discussed herein, any specific value should be interpreted to be illustrative only and non-limiting. Thus, other examples of the exemplary embodiments could have different values.

Notice that similar reference numerals and letters refer to similar items in the following figures and thus once an item is defined in one figure, it is possible that it needs not to be further discussed in the following figures.

According to an embodiment of the present disclosure, there is provided a linear vibration motor. The vibration motor comprises a housing, a spring part, a vibrator and a stator. The housing has a chamber. The stator, the vibrator and the spring part are provided in the chamber. The vibrator comprises a counterweight part and a magnet 14 connected together. The stator comprises a pole core 15 and a coil 16. The stator is used for responding to electrical signals of an external circuit and generating an electromagnetic field. For example, the coil 16 receives an electrical signal from the external circuit to generate an electromagnetic field in the coil 16.

The pole core 15 is connected to the housing, and the coil 16 is provided to the pole core 15 in a surrounding way. The housing is configured to be magnetically conductive. Optionally, for example, the pole core 15 is secured to the housing via adhesion, clamping, etc. For example, the pole core 15 is connected to a fastening element, which is arranged on the housing such that the pole core 15 is indirectly connected to the housing. The pole core 15 performs the function of concentrating the magnetic field, and it is capable of increasing the magnetic field intensity of the electromagnetic field and the directivity of the electromagnetic field.

The vibrator is suspended on the stator by means of the spring part. The magnet 14 has a polarity, and interacts with the electromagnetic field to generate a driving force that drives the vibrator to vibrate. Preferably, in an initial state, the magnet 14 and the pole core 15 are opposed with each other. In such a way, the coil 16 is symmetrical relative to the magnet 14. The vibrator at the start of vibration moves more smoothly, and suffers the greatest Lorentz force.

Optionally, the magnet 14 is a ferrite magnet or an NdFeB magnet. A skilled person in the art can set parameters of the magnet 14, such as the shape, the size, etc., according to the actual need.

The housing comprises a top part 19 and an opposed bottom part 20. The vibrator is configured to vibrate along a connecting line between the top part 19 and the bottom part 20. For example, both the top and bottom parts are a plane, and a vibrating direction of the vibrator is perpendicular to the top and bottom parts.

The linear vibration motor according to the present disclosure has its pole core 15 directly or indirectly connected to the housing. Since the housing is magnetically conductive, an electromagnetic field generated by the coil 16 can be transmitted to the housing via the pole core 15 such that the top part 19 and the bottom part 20 have the same polarity as the polarity of one end of the pole core 15 for connecting the housing. The top part 19 and the bottom part 20 with the polarity interact with the magnet 14, in order to provide an extra driving force for the vibration of the vibrator. In such a way, the driving force for the vibration of the vibrator is increased, which leads to a remarkable promotion of the response speed of the linear vibration motor, thereby the response time is effectively shortened and the vibration effect is improved.

In addition, due to the increase of the driving force, there is no need to enlarge the volume of the magnetic circuit, which conforms to the developing trend of miniaturization and lightness of electronic devices.

In addition, the sense of vibration is increased, and thus the user experience is improved.

FIG. 1 is an exploded view of a linear vibration motor according to one embodiment of the present disclosure.

As shown in FIG. 1, in this embodiment, the upper housing 11 and the lower housing 18 are engaged with one another to form a chamber. For example, a user may manufacture the housing with magnetically conductive materials that are commonly used in the art. The magnetically conductive materials may be, but not limited to, iron, cobalt, nickel, and alloy materials thereof. For example, SUS-430 is a material with a good magnetic conductivity and widespread sources.

In one example, the housing is a cuboid. As shown in FIG. 1, the upper housing 11 and the lower housing 18 are engaged with one another to form a cuboid structure. The cuboid comprises a side wall 25, and a top part 19 and an opposed bottom part 20. For example, the top part 19 is arranged at the upper housing 11, and the bottom part 20 is arranged at the lower part 18. Such structure has a regular appearance, which facilitates the installation of the linear vibration motor into an electronic device and the installation of components such as the stator, the vibrator and the spring part, etc.

Certainly, a skilled person in the art can set the shape of the housing according to the actual situation. For example, round, oval, triangle, regular polygon, or irregular shapes.

Figure 2:
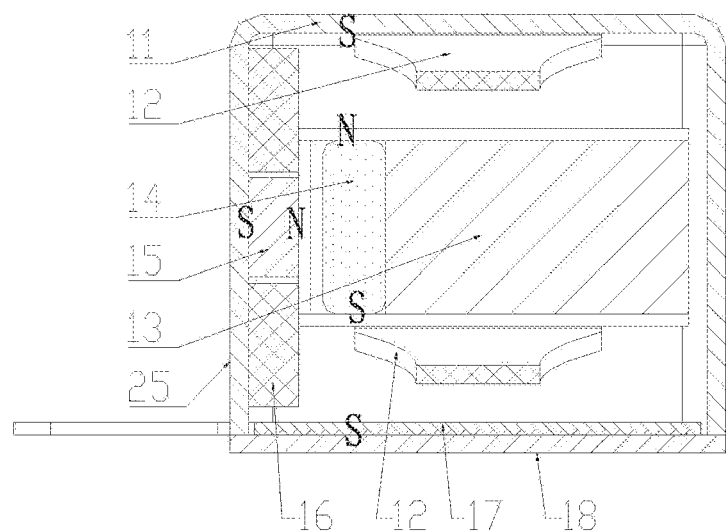
FIG. 2 is a sectional view of FIG. 1.

Preferably, the stator is arranged on a side wall 25 of the housing, and the coil 26 is in parallel with the side wall 25. For example, as shown in FIG. 1 and FIG. 2, the pole core 15 is connected to and perpendicular to one side wall 25 of the upper housing 11. The coil 16 is wound around the pole core 15, and the winding direction thereof is in parallel with the side wall 25.

Optionally, the coil 16 can be in conduction with an external circuit via leads, or via FPCB17. For example, FPCB17 is arranged at the bottom part 20 which allows a more accurate transmission of electrical signals, and a more stable signal connection of the coil 16 with the external circuit.

In one example, an extending direction of the coil 16 is in parallel with that of the vibrator. For example, as shown in FIG. 1, the cross-sectional area of the coil 16 is similar to a rectangular or an oval, and the coil 16 has a length and a width, wherein the direction of its length is the extending direction. For example, said extending direction is perpendicular to a vibrating direction of the vibrator. The cross-sectional area of the vibrator is similar to a rectangular or an oval shape, and the vibrator has a length and a width, wherein the direction of its length is the extending direction. For example, said extending direction is perpendicular to the vibrating direction.

In this way, the coil is arranged in parallel with the vibrator and facing the vibrator with a relatively large area, such that the vibrator is subject to a greater Lorentz force from the coil. Moreover, the Lorentz force can act on the vibrator more evenly, thereby preventing the vibrator from having a poor vibration effect due to an uneven force.

In addition, the vibrator is subject to a more even magnetic force action from the housing.

In addition, the linear vibration motor can be made thinner.

The magnet 14 is connected to the counterweight part. For example, the counterweight part is a mass block 13, and the magnet 14 is arranged at a side of the mass block 13 and close to one side of the stator. For example, one end of the magnet 14 close to the top part 19 is N-pole, and the other end thereof close to the bottom part 20 is S-pole. A magnetizing direction of the magnet 14 is perpendicular to the direction of the electromagnetic field, such that the vibrating direction of the vibrator is along a direction of the connecting line of the top part 19 and the bottom part 20, i.e. a direction parallel to the side wall 25.

In one example, according to Ampere's rule, an electromagnetic field is formed at the stator, wherein the N-pole is formed at one end of the pole core 15 away from the side wall 25, and the S-pole is formed at the other end of the pole core 15 connecting the side wall 25. In this example, both the top part 19 and the bottom part 20 have the polarity of S-pole.

Figure 3:
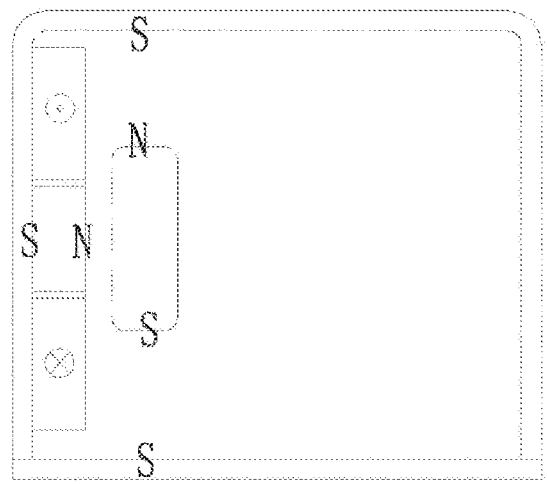
FIG. 3-FIG. 5 are schematic views of a linear vibration motor according to the embodiment of the present disclosure.
Figure 4:
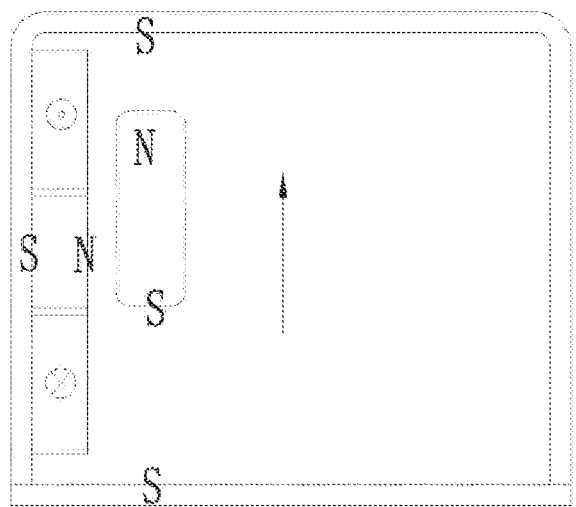
Figure 5:
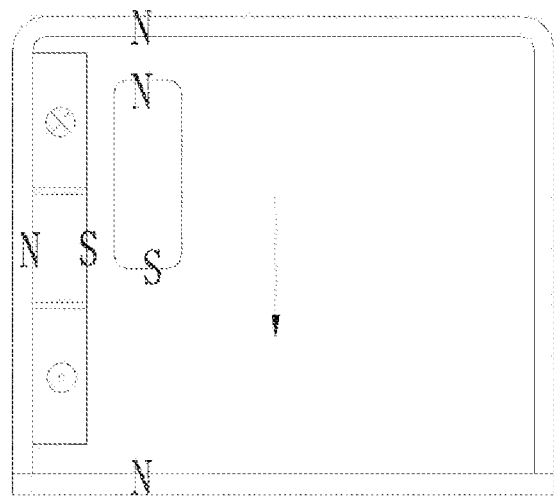

FIG. 3-FIG. 5 are schematic views of a linear vibration motor according to the embodiments of the present disclosure.

As shown in FIG. 3-FIG. 4, in an initiate state, one end of the pole core 15 close to the magnet 14 is N-pole, and the other end thereof connected to the side wall is S-pole. One side of the magnet 14 close to the top part 19 is N-pole, and another side thereof close to the bottom side 20 is S-pole. The magnet 14 is subject to a Lorentz force from the coil 16, which force is oriented towards the top part. According to the principle that like magnetic poles repel while unlike magnetic poles attract, the N-pole of magnet 14 is subject to an attractive force from the S-pole of the top part 19. In addition, the S-pole of the magnet 14 is subject to a repulsive force from the S-pole of the bottom part 20. The above three forces act towards the same direction and together form a driving force, thereby causing the vibrator to vibrate from the initial state towards a direction close to the top part 19.

It can be understood by the skilled persons in the art that after deviating from the initial state, the vibrator also is subject to a spring restoring force of the spring part, which spring restoring force has a direction opposite to the driving force.

When the vibrator vibrates upwards to a preset position, for example, a maximum displacement position, the current direction of the coil 16 changes, and the field direction of the electromagnetic field also changes. As shown in FIG. 5, at this time, the one end of the pole core 15 close to the magnet 14 is S-pole, and the other end thereof connecting the side wall 25 is N-pole. Both the top part 19 and the bottom part 20 change its polarity to N-pole. The magnet 14 is subject to a Lorentz force of the coil 16 towards the bottom part 20 and meanwhile, is subject to a repulsive force of the top part 19 towards the bottom part 20 and an attractive force of the bottom part 20 towards itself. The vibrator also is subject to a spring restoring force from the spring part towards the initial position. Under the above four driving forces, the vibrator vibrates towards the bottom part 20. After the vibrator passes the initial position, it still is subject to three driving forces from the pole core 15, the top part 19 and the bottom part 20.

When the vibrator vibrates downwards to a preset position, for example, a maximum displacement position, the field direction of the electromagnetic field again changes. The magnet 14 is subject to a Lorentz force from the coil 16 and two magnetic forces towards the top part 19 from the top part 19 and the bottom part 20. The vibrator also is subject to a spring restoring force from the spring part towards the initial position. Under the four forces, the vibrator vibrates towards the upper part 19. After the vibrator passes the initial position, it still is subject to three driving forces from the pole core 15, the top part 19 and the bottom part 20. In such a way, the linear vibration motor reciprocates to vibrate.

With respect to a traditional linear vibration motor, the vibrator is merely subject to the Lorentz forces of the coil 16 and the magnet 14 as well as the spring restoring force of the spring part, thus the driving force is relatively small. In the embodiments of the present disclosure, since the pole core 15 can transmit the magnetic field to the housing, the top part 19 and the bottom part 20 are then additionally used to impact the magnetic force onto the magnet 14, thereby remarkably increasing the driving force for the vibrator. In this way, the response time of the linear vibration motor is greatly shortened.

In one example, the spring part is a spring strip 12. The spring strip 12 comprises two spring strips respectively arranged at both sides of the vibrator along the vibrating direction. For example, the vibrating direction is the direction of the connecting line of the top part 19 and the bottom part 20. As shown in FIG. 1, the two spring strips 12 are respectively arranged at the top part 19 and the bottom part 20. In this way, the driving force for the vibrator is increased, thereby further shortening the response time of the linear vibration motor.

Figure 6:
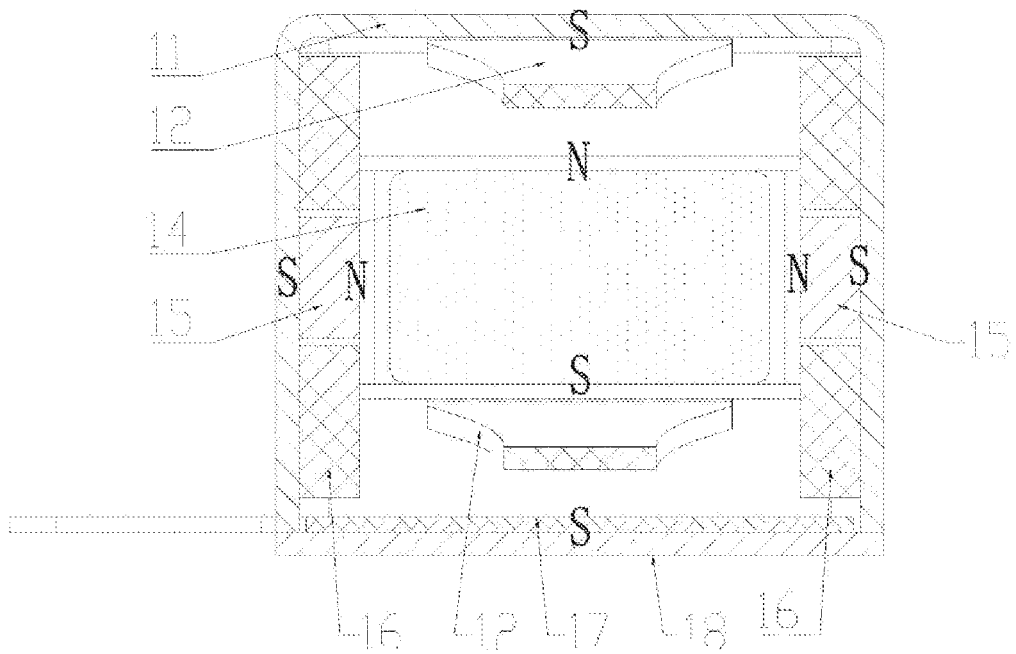
FIG. 6 is a sectional view of a linear vibration motor according to a further embodiment of the present disclosure.

FIG. 6 is a sectional view of a linear vibration motor according to a further embodiment of the present disclosure.

Figure 7:
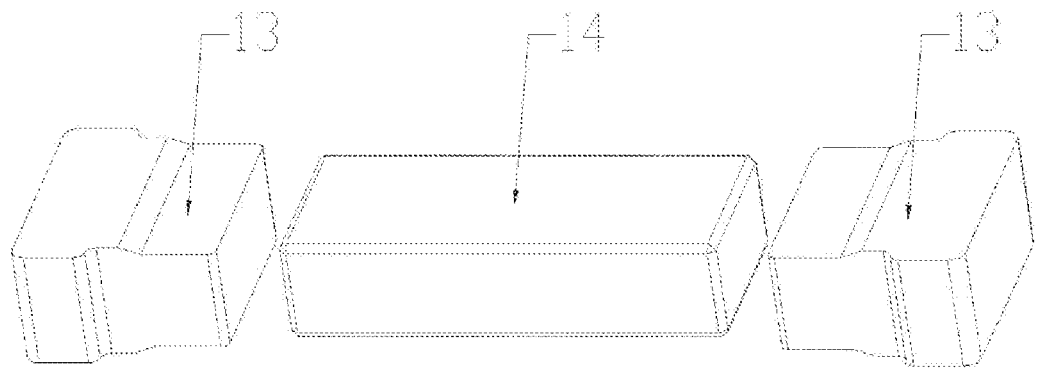
FIG. 7 is an exploded view of a vibrator of the linear vibration motor as shown in FIG. 6.

As shown in FIG. 6, in this example, the stator comprises two stators respectively arranged on the side wall 25 of the housing. The two stators are arranged to be opposed to the vibrator. For example, sides of two pole cores 15 close to the vibrator have the same polarity, in order to drive the vibrator at the same time. For example, as shown in FIG. 7, the vibrator comprises two mass blocks 13 and a magnet 14 positioned between the two mass blocks 13, and the magnet 14, for example, is a bar magnet. The above three parts are bonded together by an adhesive. For example, one end of the magnet 14 close to the top part 19 is N-pole, and the other end thereof close to the bottom part 20 is S-pole.

The electromagnetic field generated by the two stators has the same polarity at the top part 19 and the bottom part 20. By arrangement of two stators, the driving force for the vibrator is further increased, thereby further shortening the response time of the linear vibration motor.

Figure 8:
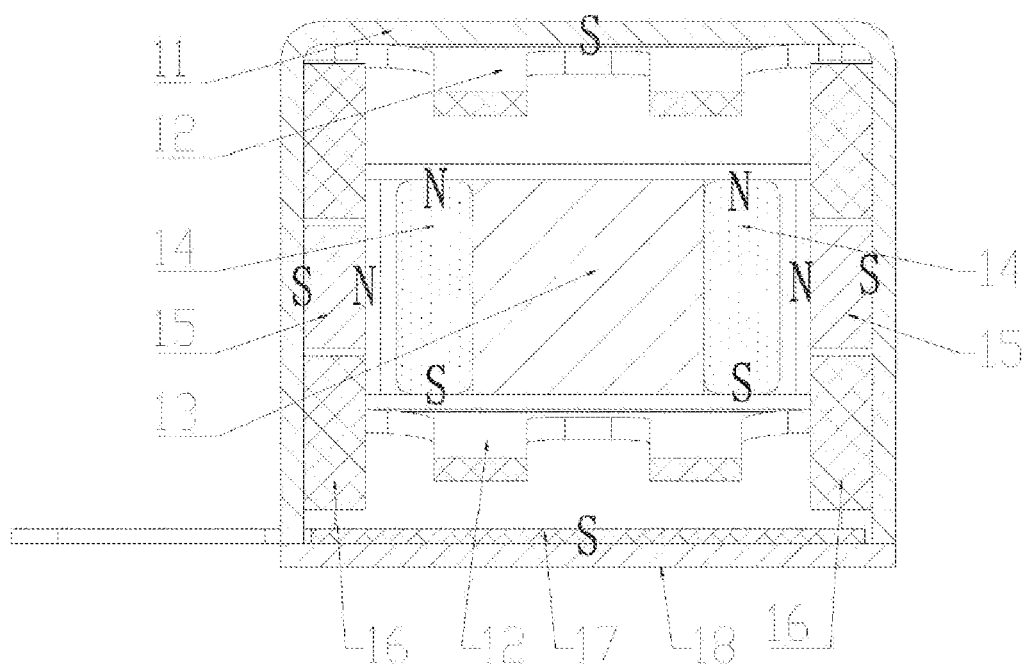
FIG. 8 is a sectional view of a linear vibration motor according to a third embodiment of the present disclosure.

FIG. 8 is a sectional view of a linear vibration motor according to a third embodiment of the present disclosure.

Figure 9:
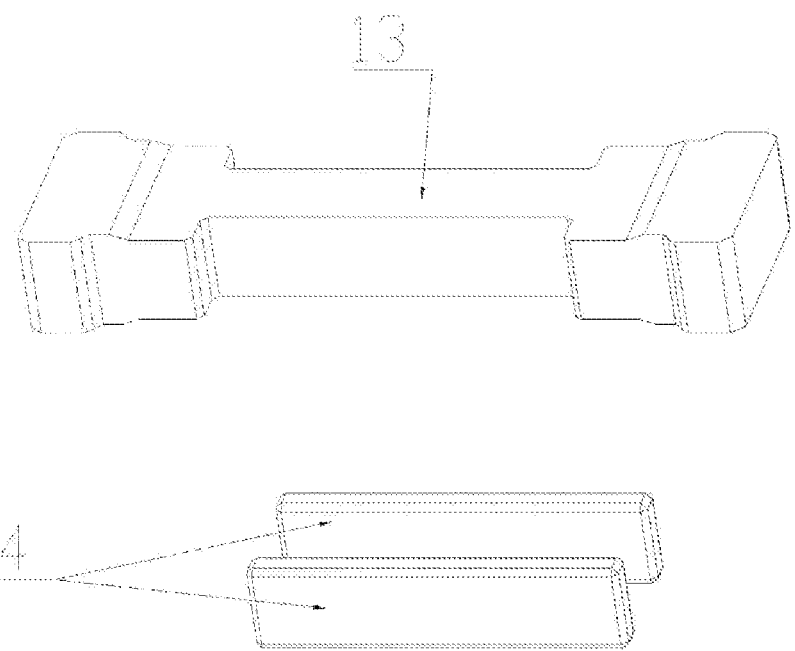
FIG. 9 is an exploded view of a vibrator of the linear vibration motor as shown in FIG. 8.

As shown in FIG. 8, in this example, the stator comprises two stators respectively arranged on the side wall 25 of the housing. For example, the two stators are arranged to be opposed to one another. For example, sides of two pole cores 15 close to the vibrator have the same polarity, in order to drive the vibrator at the same time. The magnet 14 comprises two magnets arranged to be opposed to one another at both sides of the counterweight part. The two magnets 14 correspond to the two stators respectively. For example, as shown in FIG. 9, two opposite sides of the mass block 13 are to each provided with a magnet 14. One side of the two magnets 14 close to the top part 19 is N-pole, and another side thereof close to the bottom 20 is S-pole.

In such a way, the two stators impact a driving force on their adjacent magnet 14 at the same time, thereby further increasing the driving force for the vibration of the vibrator.

In addition, a middle part of the vibrator is constituted by a mass block 13, which increases the weight of the vibrator. In this way, it guarantees that the linear vibration motor has a sufficiently short response time, and meanwhile the vibration level of the linear vibration motor is increased.

Figure 10:
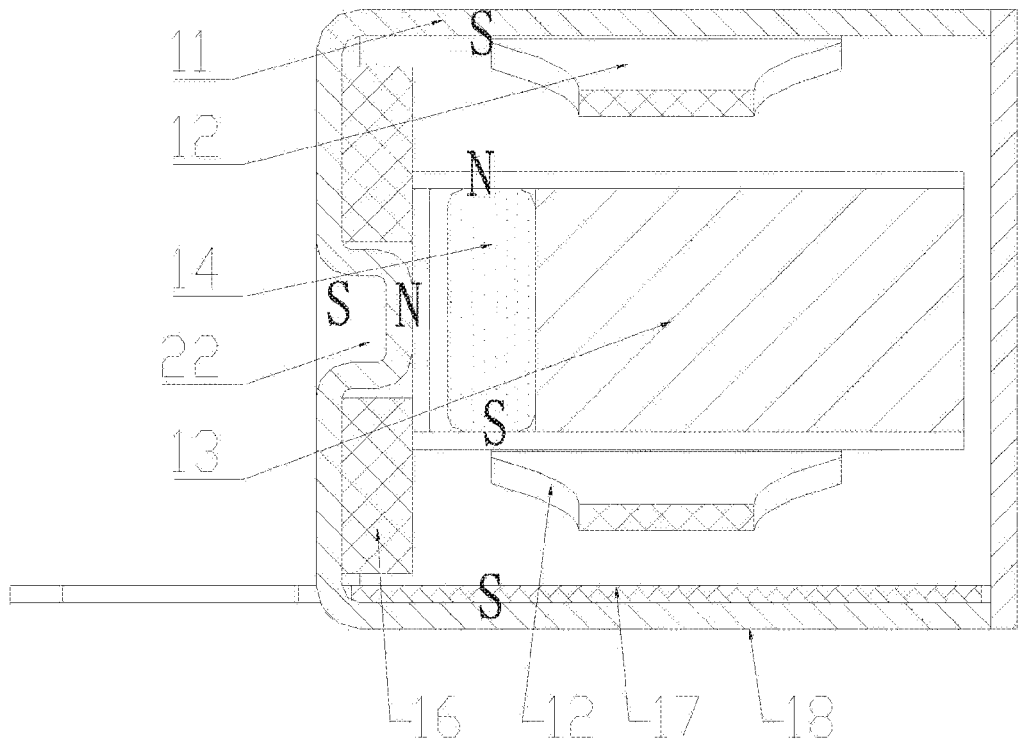
FIG. 10 is a sectional view of a linear vibration motor according to a fourth embodiment of the present disclosure.

FIG. 10 is a sectional view of a linear vibration motor according to a fourth embodiment of the present disclosure.

As shown in FIG. 10, in this example, the side wall 25 is concaved inwards to form a pole core 15. The coil 16 is configured to wound around the pole core 15. For example, by means of punch forming, part of the side wall 25 is concaved inwards to form a bulge 22, i.e., the pole core 15, inside the chamber. In such a way, the pole core 15 and the housing form a seamless connection, which makes magnetic lines of force more smooth, thereby further increasing the magnetic field intensity of the top part 19 and the bottom part 20, increasing the driving force for the vibration of the vibrator, and further shortening the response time of the linear vibration motor.

In addition, an integrated molding saves the material of the pole core 15 and thus reduces the cost. The number, the size, and the shape of the bulge 22 can be arranged according to an actual need.

Figure 11:
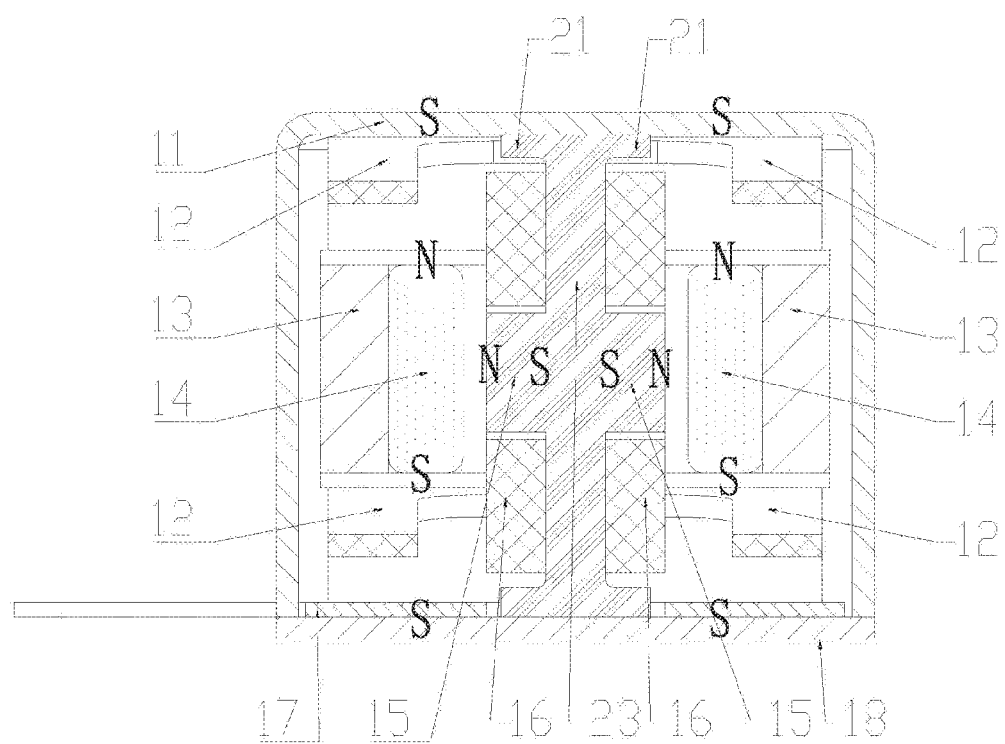
FIG. 11 is a sectional view of a linear vibration motor according to a fifth embodiment of the present disclosure.

FIG. 11 is a sectional view of a linear vibration motor according to a fifth embodiment of the present disclosure.

As shown in FIG. 11, in this example, the linear vibration motor further comprises a frame 23 arranged inside the chamber, which frame 23 is configured to be magnetically conductive. One end of the frame 23 is connected to the top part 19 and the other end thereof is connected to the bottom part 20. The pole core 15 comprises two pole cores arranged in an opposed manner in the middle part of the frame 23. The coil 16 comprises two coils respectively wound around the two pole cores 15. The magnet 14 comprises two magnets each corresponding to one of the two coils 16. In such a way, the magnetic field generated by the pole cores 15 can be more evenly distributed at the top part 19 and the bottom part 20, such that the vibrator is subject to a more even driving force.

In addition, in this way, the attractive force and the repulsive force between the magnet 14 and the top part 19 and between the magnet 14 and the bottom part 20 are enhanced, thereby improving the driving force for the vibrator. The response time thus is further shortened, and the user experience is improved.

For example, the frame 23 is made of magnetically conductive material that is commonly used in the art. The frame 23 is arranged in the middle part of the chamber, and is perpendicular to the top part 19 and the bottom part 20, in order to make the vibration of the vibrator more balanced, thereby reducing polarization. portions of the frame 23 connected with the top part 19 and the bottom part 20 have protrusions 21 projecting beyond two opposite sides of the frame 23, and in such a way that contacting areas between the frame 23 and the top part 19 and between the frame 23 and the bottom part 20 are enlarged, the frame 23 thus is positioned more steadily, thereby preventing the frame 23 from inclining during a long-time vibration. The two opposite sides of the frame 23 is provided with a pole core 15 respectively, and each of two coils 16 is wound around the respective pole core 15. In such a way, two opposite stators are formed in the middle part of the chamber. For example, the vibrator has two magnets 14 each arranged to be opposed to one of the two pole cores 15.

Figure 13:
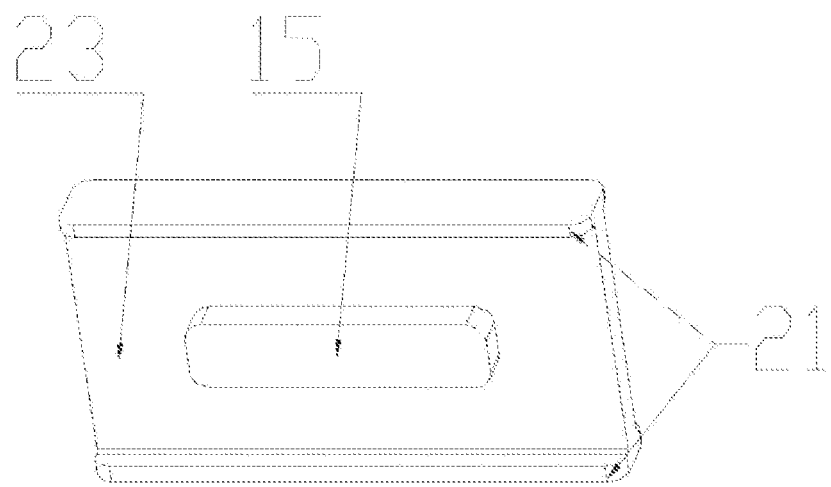
FIG. 13 is a structural schematic view of an integrated pole core of the linear vibration motor as shown in FIG. 11.

Preferably, the pole cores 15 are formed in one piece with the frame 23. For example, as shown in FIG. 13, the pole core 15 and the frame 23 are made of SUS430 material by means of punch forming or injection molding. For example, the pole cores 15 and the frame 23 (including protrusions 21) are manufactured in one piece to form a structure similar to the Chinese character "王". In such a way, the manufacturing difficulty of the pole core 15 and the frame 23 is reduced.

In addition, the pole cores 15 are in seamless connection with the frame 23, such that the deflection of magnetic lines are more smooth, thereby increasing the magnetic field intensity of the top par 19 and the bottom part 20.

In addition, due to the increase of the magnetic field intensity, the response time of the linear vibration motor is further shortened.

Figure 12:
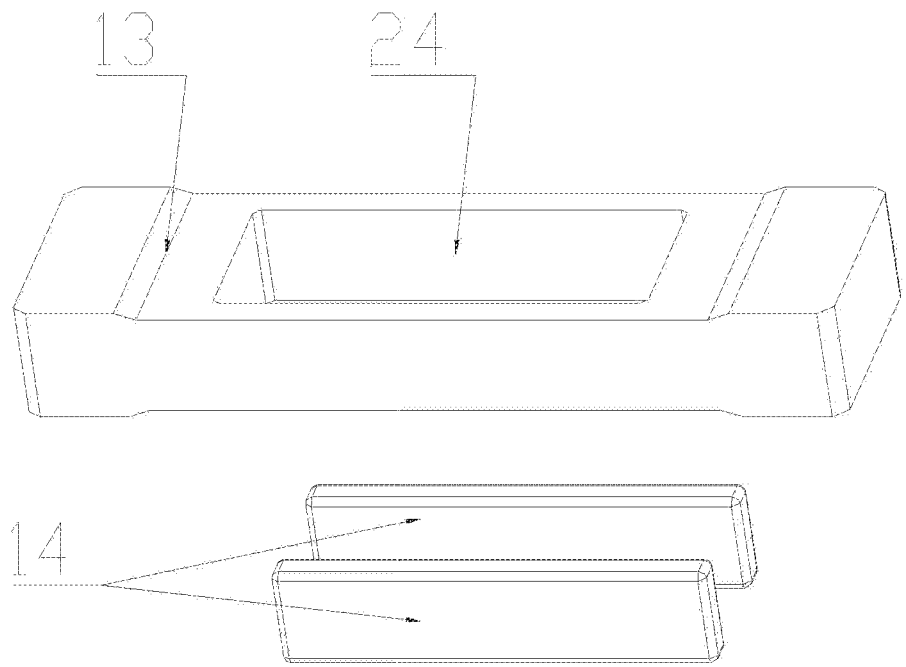
FIG. 12 is an exploded view of a vibrator of the linear vibration motor as shown in FIG. 11.

Furthermore, the counterweight part has a middle hollow area 24, two magnets 14 being arranged at opposing sides of the middle hollow area 24. The vibrator is sleeved outside the stator. For example, as shown in FIG. 12, two bar magnets are symmetrically arranged at the opposing sides of the middle hollow area 24. One end of the two bar magnets close to the top part 19 is N-pole, and the other end thereof close to the bottom part 20 is S-pole. Magnetizing directions of the bar magnets are perpendicular to the electromagnetic field direction. In such a way, a balanced vibration of the vibrator is guaranteed, and polarizations thus are avoided.

In addition, the structural strength of the vibrator is improved.

According to a further embodiment of the disclosure, there is provided an electronic device. The electronic device may be, but not limited to, a mobile phone, a tablet computer, a smart watch, a smart wristband, a PSP, a notebook computer, a VR device, wireless earphones, etc. Said electronic devices comprise a linear vibration motor according to the present disclosure.

The electronic device has characteristics such as a good vibration level and a quick response speed of vibration.

Although some specific embodiments of the present disclosure have been described in detail with reference to examples, the skilled persons in the art should understand that the above-mentioned examples are intended to be illustrative only and not to limit the scope of the present disclosure. It is understood in the art that the above embodiments may be modified without departing from the scope and spirit of the present disclosure. The scope of the present disclosure is defined by the attached claims.

The invention claimed is:

1. A linear vibration motor, comprising a housing, a spring part, a vibrator and a stator, the housing having a chamber, the stator, the vibrator and the spring part being provided in the chamber, the vibrator comprising a counterweight part and a magnet connected together, the stator comprising a pole core and a coil, the pole core being connected to the housing, the coil being wound around the pole core, the housing being configured to be magnetically conductive, the vibrator being suspended relative to the stator by the spring pant, the housing comprising a top part and an opposed bottom part, and the vibrator being configured to vibrate along a connecting line between the top part and the bottom part, further comprising a frame inside the chamber, the frame being configured to be magnetically conductive, with a first end of the frame being connected to the top part and a second end of the frame being connected to the bottom part, the pole core comprising two pole cores arranged in an opposite manner at a middle part of the frame, the coil comprising two coils wound around the two pole cores respectively, and the magnet comprising two magnets corresponding to the two coils respectively.

2. The linear vibration motor according to claim 1, wherein the housing is a cuboid.

3. The linear vibration motor according to claim 1, wherein the pole core is formed in one piece with the frame.

4. The linear vibration motor according to claim 1, wherein the counterweight part has a middle hollow area, the two magnets being arranged at both sides of the middle hollow area, and the vibrator being sleeved outside the stator.

5. An electronic device, comprising a linear vibration motor according to claim 1.

6. The linear vibration motor according to claim 1, wherein the frame is arranged in the middle part of the chamber, and is perpendicular to the top part and the bottom part.

7. The linear vibration motor according to claim 1, wherein portions of the frame connected with the top part and the bottom part have protrusions protecting beyond two opposite sides of the frame.

8. The linear vibration motor according to claim 1, wherein the pole core is in seamless connection with the frame.

* * * * *